UNITED STATES PATENT OFFICE.

FREDERICK M. BECKET, OF NIAGARA FALLS, NEW YORK, ASSIGNOR TO ELECTRO METALLURGICAL COMPANY, OF NIAGARA FALLS, NEW YORK, A CORPORATION OF WEST VIRGINIA.

METHOD OF TREATING TUNGSTEN ORES.

1,153,594.  Specification of Letters Patent. Patented Sept. 14, 1915.

No Drawing.   Application filed April 8, 1914. Serial No. 830,419.

*To all whom it may concern:*

Be it known that I, FREDERICK M. BECKET, a subject of the King of Great Britain, residing at Niagara Falls, in the county of Niagara and State of New York, have invented certain new and useful Improvements in Methods of Treating Tungsten Ores, of which the following is a specification.

This invention relates to the treatment of scheelite or similar ores, concentrates, or products hereinafter referred to as ores of the calcium-tungstate type.

I have observed that scheelite and its concentrates often contain considerable proportions of phosphorus. For example, a representative sample was found to contain:—

| | | |
|---|---|---|
| $WO_3$ | 54.60 | per cent. |
| FeO | 3.45 | " " |
| P | 0.212 | " " | the balance consisting almost entirely of lime and silica. The ratio of tungsten to phosphorus, expressed as $$\frac{W}{P}$$

in this ore was about 204. It is usually impracticable to eliminate this phosphorus by an acid treatment applied to the raw ore, on account of the losses of tungsten which would be involved. I have found, however, that by subjecting the ore to a suitable temperature, as for instance a red heat, its tungsten-content is rendered nearly insoluble in certain acid reagents, including concentrated sulfuric acid, while the phosphorus remains in a readily soluble condition. The ore thus purified is smelted under proper conditions, and yields a metal or alloy commercially free from phosphorus. This portion of the process may be carried out for example as follows: The ore, in lumps or ground, is heated for some hours to redness, and after cooling, is mixed to a stiff paste with sulfuric acid, preferably concentrated, suitable proportions being two parts by weight of ore to one part of acid. The mixture is allowed to stand for some hours, during which time some self-heating occurs. After this has subsided the residue is washed with water until approximately free from sulfuric acid. By this treatment the phosphorus may be eliminated with practical completeness, without serious loss of tungsten. For example, in the case of the ore above mentioned, the ratio of tungsten to phosphorus was increased from $$\frac{W}{P}=204 \text{ to } \frac{W}{P}=3093,$$

with a loss of less than one per cent. of the total tungsten.

The resulting product will serve directly as a source of tungsten metal, which may be obtained by silicon reduction in the electric furnace: or ferrotungsten may be prepared by reducing it in like manner in presence of the proper proportion of iron, either as scrap or as oxid. For the preparation of ferrotungsten, however, the following method is preferred: The scheelite, substantially free from phosphorus or freed from phosphorus in the manner above described, is mixed with an ore of the iron-tungstate type, as ferberite, wolframite, hübnerite, or the like, the mixture being proportioned to contain iron and tungsten in the ratio necessary to produce the desired ferro-alloy. This mixture is then reduced by silicon in the electric furnace in accordance with the known methods as described in my prior patents.

In the method as above described, the highly purified scheelite acts, so far as the phosphorus is concerned, as a diluent for the less pure ores of the iron-tungstate type. The method, therefore, renders directly available for use in the preparation of low-phosphorus ferrotungsten, such iron-tungstate ores as by reason of their higher phosphorus-content could not be thus employed without special treatment for their purification.

While I have described the purification of the calcined scheelite by means of concentrated or strong sulfuric acid, it should be understood that diluted acid may be used for the same purpose, although the loss of tungsten by solution is thereby somewhat increased. In some instances, also, I have successfully applied concentrated sulfuric acid to the purification of raw scheelite ores or concentrates, but it is impracticable, so far as now known, to accomplish the commercial purification of raw scheelite by means of dilute sulfuric acid, without dissolving considerable quantities of tungsten.

I claim:—

1. The method of preparing ferrotungsten from low-phosphorus ores of the calcium-tungstate type, which consists in mixing therewith an ore of the iron-tungstate type, and smelting the mixture, said ores proportioned to yield a low-phosphorus alloy of the desired tungsten-content.

2. The method of treating ores of the calcium-tungstate type and producing low-phosphorus ferrotungsten, which consists in heating such ore under conditions to reduce the solubility of the contained tungsten, treating it with an acid reagent to increase the ratio of tungsten to phosphorus, mixing with the purified ore an ore of the iron-tungstate type, and smelting the mixture.

3. In a method of preparing tungsten or ferrotungsten from ores of the calcium-tungstate type, the step which consists in heating the ore under conditions to reduce the solubility of the contained tungsten, and then treating the ore with a suitable solvent to increase the ratio of tungsten to phosphorus.

4. In a method of preparing tungsten or ferrotungsten from ores of the calcium-tungstate type, the step which consists in heating the ore under conditions to reduce the solubility of the contained tungsten, and then treating the ore with an acid reagent under conditions to increase the ratio of tungsten to phosphorus.

5. In a method of preparing tungsten or ferrotungsten from ores of the calcium-tungstate type, the step which consists in heating the ore under conditions to reduce the solubility of the contained tungsten, and then treating the ore with strong sulfuric acid under conditions to increase the ratio of tungsten to phosphorus.

6. In a method of preparing tungsten and ferrotungsten from ores of the calcium-tungstate type, the step which consists in treating the ore with a suitable solvent, before reduction, to increase the ratio of tungsten to phosphorus.

In testimony whereof I affix my signature in presence of two witnesses.

FREDERICK M. BECKET.

Witnesses:
  J. A. HOLLADAY,
  G. C. FURNESS.